United States Patent [19] [11] 4,181,761
Ishimoto et al. [45] Jan. 1, 1980

[54] SHAPED ARTICLES OF ETHYLENE-VINYL ACETATE COPOLYMER HAVING A COATING OF NCO-FREE RADICAL-CONTAINING SYNTHETIC RESIN PAINT

[75] Inventors: Ryoji Ishimoto; Katsuhiko Hasuo, both of Ichihara; Masanori Hisatomi, Kisarazu; Kensaku Yamawaki, Ichihara; Sadao Masuda, Chiba; Seiichi Tada, Ichihara, all of Japan

[73] Assignee: Mitsui Polychemicals Co., Ltd., Tokyo, Japan

[21] Appl. No.: 967,713

[22] Filed: Dec. 8, 1978

[30] Foreign Application Priority Data

Dec. 12, 1977 [JP] Japan ................................. 52-148197

[51] Int. Cl.² .................... B60R 13/00; B60R 13/02
[52] U.S. Cl. .......................................... 428/31; 293/1; 428/409; 428/420; 428/423; 428/425; 428/520; 428/522
[58] Field of Search ............... 428/420, 423, 522, 520, 428/425, 409, 31; 293/1, 126, 128

[56] References Cited

U.S. PATENT DOCUMENTS

| | | | |
|---|---|---|---|
| 3,198,692 | 8/1965 | Bridgeford | 428/420 |
| 3,790,437 | 2/1974 | Haley | 428/425 |
| 3,877,969 | 4/1975 | Tatsumi | 428/425 |
| 3,889,031 | 6/1975 | Tatsumi | 428/425 |
| 3,949,114 | 4/1976 | Viola | 428/425 |
| 4,082,854 | 4/1978 | Yamada | 428/522 |

FOREIGN PATENT DOCUMENTS 49-41088 7/1974 Japan.
49-31785 12/1974 Japan.
52-27453 1/1977 Japan.

*Primary Examiner*—Ellis P. Robinson
*Attorney, Agent, or Firm*—Sherman & Shalloway

[57] ABSTRACT

A shaped article composed of a substrate of an EVA copolymer and a coating of a paint containing an NCO-free radical bonded firmly to the substrate, said substrate being either (A) a shaped article of EVA copolymer having a vinyl acetate content of about 3 to about 35% by weight, the article having a coating on its surface formed from a solution of a resin selected from specified resins $(a_1)$, $(a_2)$, $(a_3)$ and $(a_4)$, (B) a shaped article of a blend of EVA copolymer having the vinyl acetate content as defined above with a resin selected from specified resins $(b_1)$, $(b_2)$, $(b_3)$ and $(b_4)$, (B') a shaped article of a graft copolymer of EVA having the vinyl acetate content as defined above, and grafted thereto, at least one specified monomer, or (B") a shaped article resulting from the saponification of the surface of a shaped article of EVA copolymer having the vinyl acetate content as defined above.

5 Claims, No Drawings

SHAPED ARTICLES OF ETHYLENE-VINYL ACETATE COPOLYMER HAVING A COATING OF NCO-FREE RADICAL-CONTAINING SYNTHETIC RESIN PAINT

This invention relates to shaped articles of an ethylene-vinyl acetate copolymer (to be sometimes referred to hereinbelow as "EVA copolymer") having a surface of improved physical properties, especially scratch or abrasion resistance, without adversely affecting the desirable properties of the shaped articles themselves. Specifically, it relates to shaped articles of EVA copolymer having a firmly bonded coating of an isocyanato-free radical-containing synthetic resin paint such as a polyurethane-type paint which has previously been unable to be bonded firmly to the surfaces of shaped articles from EVA copolymer.

More specifically, the invention relates to a shaped article comprising (A) a shaped article of an EVA copolymer of a specified vinyl acetate content having a coating formed from a solution of a resin selected from specified resins ($a_1$), ($a_2$), ($a_3$) and ($a_4$) formed on the surface of (A), and (C) a coating having an elongation of at least 10% and composed of an isocyanate-free radical-containing synthetic resin paint; or comprising a shaped article (B) of a blend of the EVA copolymer and a specified amount of a resin selected from specified resins ($b_1$), ($b_2$), ($b_3$) and ($b_4$), a shaped article (B') of a graft copolymer composed of an EVA copolymer of a specified vinyl acetate content and a specified monomer grafted thereto, or (B'') a shaped article resulting from the saponification of the surface of a shaped article of an EVA copolymer of a specified vinyl acetate content and formed on the surface of (B), (B') or (B''), the aforesaid coating (C).

The invention also relates to a method for improving the surface adhesiveness of a shaped article of an EVA copolymer which can be advantageously utilized in providing the aforesaid shaped articles having the coating (C).

EVA copolymers have many advantages including good pliability, rubbery elasticity, ease of molding and low cost, and are widely used as films, sheets, laminates, foams, adhesives, and other various kinds of shaped articles. The shaped articles of EVA copolymers, however, are limited in their application because of the unsatisfactory physical properties of their surfaces, especially their poor abrasion or scratch resistance, and their utilization at present is confined to applications which utilize their pliability and rubbery elasticity. In shaped articles which require abrasion resistance or scratch resistance, only temporary measures such as delustering or embossing treatment are taken to hide scratches on the surface of the shaped article. It has been desired therefore to provide shaped articles of EVA copolymers having improved surface properties which can find practical application. For examples, much interest is aroused in the pliability, rubbery elasticity, good shapability and low cost of EVA copolymers in automotive applications such as bumper cards and decorative components, but the poor surface characteristics of these shaped articles greatly limit their utilization.

Modification of the surfaces of such shaped articles would be feasible to improve the surface characteristics of such EVA copolymer shaped articles. However, attempt to impart the desired improved properties is likely to affect the desirable properties of the EVA copolymers, and therefore, such a modifying procedure is difficult to perform commercially. Another method of improvement would be to form on the surface of such an EVA copolymer article a coating of a material capable of improving abrasion resistance, for example a paint capable of imparting such a property. However, as is well known, such a paint cannot be adhered firmly because of the poor surface activity of the EVA copolymer article. It is difficult therefore to utilize the coating technique. In order to improve the adhesion of the surface of the EVA copolymer article and to form a firmly adhering coating of a suitable material on it, it would be feasible to employ a flame spray treatment, corona discharge treatment, a treatment with a mixture of chromic acid and sulfuric acid, etc. which are the generally known surface treating methods for olefinic resins. The flame spray treatment and corona discharge treatment however, have the defect that shaped articles of complex configurations cannot be uniformly treated, or long periods of time are required, or the working efficiency is poor. The mixture of chromic acid and sulfuric acid, on the other hand, degrades the EVA copolymer or is likely to become a source of pollution.

The present inventors made investigations in an attempt to provide a method for improving the surface characteristics of shaped articles of EVA copolymer which has not been commercially practised in the past, and shaped articles of EVA copolymer having improved surface characteristics.

These investigations led to the discovery that shaped articles of EVA copolymers having improved surface characteristics such as abrasion or scratch resistance and appearance can be provided without adversely affecting the desirable properties of the EVA copolymer by forming a coating on the surface of a shaped article (A) of an EVA copolymer having a specified vinyl acetate content from a solution of a resin selected from the group consisting of ($a_1$), ($a_2$), ($a_3$) and ($a_4$), and then forming on the resulting coating a firmly adhering coating (C) having an elongation of at least 10% from a paint capable of forming a coated film at a temperature below the heat softening temperature or heat distortion temperature of the shaped article of the EVA copolymer; or by forming the coating (C) on the surface of a shaped article (B) of a blend of the aforesaid EVA copolymer and a specified amount of a resin selected from the group consisting of ($b_1$), ($b_2$), ($b_3$) and ($b_4$), or a shaped article (B') of a graft copolymer of an EVA copolymer of a specified vinyl acetate content and a monomer grafted thereto, or a shaped article (B'') resulting from the saponification of the surface of a shaped article of an EVA copolymer of a specified vinyl acetate copolymer.

It is an object of this invention therefore to provide a shaped article of an ethylene-vinyl acetate copolymer having improved surface characteristics.

Another object of this invention is to provide a method for improving the surface adhesiveness of a shaped article of an ethylene-vinyl acetate copolymer, which can be utilized as a substrate in providing the aforesaid shaped article of improved surface characteristics.

The shaped article in accordance with this invention comprises a substrate substantially of an ethylene-vinyl acetate copolymer and formed on its surface, (C) a coating having an elongation of at least 10% formed from a synthetic resin paint containing an NCO-free radical; said substrate being either (A) a shaped article of an ethylene-vinyl acetate copolymer having a vinyl acetate content of about 3 to about 35% by weight, preferably about 5 to about 25% by weight, said shaped article having a coating on its surface formed from a solution of a resin selected from the group consisting of ($a_1$) a partially saponified product having a degree of saponification of up to about 50% of an ethylene-vinyl acetate copolymer having a vinyl acetate content of about 12 to about 45% by weight, ($a_2$) a graft copolymer of said partially saponified ethylene-vinyl acetate copolymer ($a_1$) and a carboxyl-containing monomer grafted thereto, ($a_3$) a graft copolymer of an ethylene-vinyl acetate copolymer having a vinyl acetate content of about 12 to about 45% by weight and grafted thereto, at least one monomer having a radical selected from the group consisting of hydroxyl, carboxyl, acid anhydride, alkoxy and glycidyl radicals, and ($a_4$) a copolymer of ethylene, an unsaturated ester and at least one monomer having a radical selected from the group consisting of hydroxyl, carboxyl, alkoxy and glycidyl radicals, said copolymer having an ethylene content of about 55 to about 88% by weight, (B) A shaped article of a blend of an ethylene-vinyl acetate copolymer having a vinyl acetate content of about 3 to about 35% by weight with a resin selected from the group consisting of ($b_1$) about 5 to about 30 parts by weight, based on the blend, of a saponification product of an ethylene-vinyl acetate copolymer having a vinyl acetate content of about 5 to about 90% by weight, ($b_2$) about 5 to about 30% by weight, based on the weight of the blend, of a copolymer of ethylene and at least one monomer having a radical selected from the group consisting of hydroxyl, carboxyl, alkoxy and glycidyl radicals, said copolymer having an ethylene content of about 70 to about 98%, ($b_3$) about 2 to about 30% by weight, based on the blend, of a copolymer of ethylene, an unsaturated ester and at least one monomer having a radical selected from the group consisting of hydroxyl, carboxyl, alkoxy and glycidyl radicals, said copolymer having an ethylene content of about 55 to about 98% by weight, and ($b_4$) about 0.5 to about 30% by weight, based on the blend, of a graft copolymer of a polymer of an α-olefin or a copolymer of an α-olefin with up to 45% by weight of another copolymerizable monomer, and grafted thereto, at least one monomer having a radical selected from the group consisting of hydroxyl, carboxyl, acid anhydride, alkoxy and glycidyl radicals, (B') a shaped article of a graft copolymer of an ethylene-vinyl acetate copolymer having a vinyl acetate content of about 3 to about 35% by weight, and grafted thereto, at least one monomer having a radical selected from the group consisting of hydroxyl carboxyl, acid anhydride, alkoxy and glycidyl radicals, or (B") a shaped article resulting from the saponification of the surface of a shaped article of an ethylene-vinyl acetate copolymer having a vinyl acetate content of 3 to 35% by weight.

The surface adhesiveness of the shaped article of EVA copolymer (substrate) used to provide the shaped articles of this invention is improved either by forming a coating on the surface of a shaped article of an EVA copolymer having a vinyl acetate content of about 3 to about 35% by weight from a solution of a resin selected from the group consisting of ($a_1$), ($a_2$), ($a_3$) and ($a_4$); or by shaping a blend of the EVA copolymer and the resin ($b_1$), ($b_2$), ($b_3$) or ($b_4$), or grafting a specific monomer to the EVA copolymer and then shaping the graft copolymer, or shaping the EVA copolymer and saponifying the surface of the shaped article.

The EVA copolymer having a vinyl acetate content of about 3 to about 35% by weight, preferably about 5 to about 25% by weight, used to form the shaped articles of this invention is preferably prepared by bulk polymerization through a high pressure method. A composition of the EVA copolymer for preparing such shaped articles may contain conventional additives. Examples of such other additives, based on the weight of the EVA copolymer or the blend of the EVA copolymer and the resin selected from ($b_1$) to ($b_4$), are up to about 30% by weight of other olefinic resins such as polyethylene, polypropylene or an ethylene-propylene copolymer; up to about 30% by weight of fillers such as glass fibers, glass spheres, asbestos, calcium carbonate, silica and clay; up to about 20% by weight of pigments and other coloring agents such as carbon black and titanium oxide; up to about 0.5% by weight of known oxidation inhibitors; and up to about 1% by weight of known weatherability stabilizers.

If the EVA copolymer has a vinyl acetate content of less than about 3% by weight, the shaped article lacks pliability and does not exhibit the characteristics of EVA copolymer. On the other hand, if the vinyl acetate content exceeds about 35% by weight, the copolymer is difficult to fabricate into articles, and the resulting articles have low thermal stability.

In the present invention, any known melt-shaping techniques can be used to produce the shaped article of the EVA copolymer (or EVA copolymer composition) or EVA copolymer blend (or EVA copolymer blend composition). For example, injection molding, extrusion molding, and compression molding can be utilized. The configuration of the shaped article can be selected as desired, and may be in the form of films, sheets, plates, rods, tubes and other solid forms such as automobile finishing or trimming parts. The shaped articles may be of any desired structure such as a multilayer laminate or foamed structure. The shaped articles may also be in the cured state.

According to one embodiment of the present invention, a coating is formed on the surface of the shaped article of the EVA copolymer from a solution of at least one resin selected from ($a_1$) to ($a_4$).

The partially saponified product ($a_1$) of the EVA copolymer has a degree of saponification (the ratio of those acetate groups in the EVA copolymer which have been converted to hydroxyl groups) of up to about 50%, usually about 0.5 to about 40%, preferably about 2 to about 30%. If the degree of saponification is extremely small, the adhesion of the coated film to the paint tends to be insufficient. On the other hand, if the degree of saponification exceeds about 50%, the adhesion of the coated film to the EVA shaped article is insufficient, and the saponified copolymer has poor solubility in solvents. The EVA copolymer to be saponified has a vinyl acetate content of about 12 to about 45%. If the vinyl acetate content is less than about 12% by weight, the copolymer has poor solubility in solvents. If it exceeds about 45% by weight, the adhesion of the coated film to the EVA shaped article is low.

The method for producing the partially saponified EVA copolymer is well known. For example, it can be prepared by dissolving the EVA copolymer in an organic solvent such as toluene or xylene, reacting it with a lower alcohol such as methanol or ethanol and an alkali such as sodium methylate and sodium hydroxide at 40° to 60° C. (if desired, in the presence of a suitable amount of water), adding methanol with stirring after the reaction to precipitate the resulting polymer, and separating, washing and drying the polymer.

The grafting monomer having a carboxyl group used to form the graft copolymer ($a_2$) includes, for example, acrylic acid, methacrylic acid, maleic acid, fumaric acid, crotonic acid, itaconic acid, and citraconic acid. Acid anhydrides which will form free carboxylic acids by esterification reaction with the hydroxyl groups of the partially saponified EVA copolymer ($a_1$) can also be used as the grafting monomer. Examples of the acid anhydrides are maleic anhydride, fumaric anhydride, itaconic anhydride, and phthalic anhydride.

The ratio of the monomer grafted in the graft copolymer ($a_2$) is preferably about 0.05 to 3% by weight based on the graft copolymer.

Examples of the grafting monomer used to form the graft copolymer ($a_3$) include hydroxyl-containing monomers such as hydroxyalkyl esters of unsaturated carboxylic acids (e.g., hydroxyethyl acrylate, hydroxyethyl methacrylate, hydroxypropyl acrylate or hydroxypropyl methacrylate) and chlorohydroxyalkyl esters of unsaturated carboxylic acids (e.g., chlorohydroxyethyl acrylate, chlorohydroxyethyl methacrylate, chlorohydroxypropyl acrylate or chlorohydroxypropyl methacrylate); carboxyl-containing monomers such as unsaturated carboxylic acids (e.g., acrylic acid, methacrylic acid, maleic acid, fumaric acid, itaconic acid, crotonic acid or citraconic acid); monomers containing an acid anhydride radical such as unsaturated carboxylic anhydrides (e.g., maleic anhydride, itaconic anhydride, citraconic anhydride, maleic anhydride/styrene, maleic anhydride/vinyl acetate, maleic anhydride/ethylene, maleic anhydride/propylene, or maleic anhydride/butene); alkoxy-containing monomers such as alkoxyvinyl silanes (e.g., trimethoxyvinyl silane, triethoxyvinyl silane or dimethoxyethoxy vinyl silane) and alkylalkoxyvinyl silanes (e.g., methyldimethoxyvinyl silane or methyldiethoxyvinyl silane); and glycidyl-containing monomers such as glycidyl esters or unsaturated carboxylic acids (e.g., glycidyl acrylate or glycidyl methacrylate).

The grafting ratio of such a monomer is preferably about 0.02 to 5% by weight based on the graft copolymer.

The copolymer ($a_4$) is a terpolymer of ethylene, an unsaturated ester and at least one monomer having a radical selected from the group consisting of a hydroxyl radical, carboxyl radical, alkoxy radical and glycidyl radical. Examples of the unsaturated ester are vinyl esters and unsaturated carboxylic acid esters. Specific examples of the vinyl esters are vinyl formate, vinyl acetate, vinyl propionate, vinyl butyrate and vinyl benzoate. Examples of the unsaturated carboxylic acid esters include methyl acrylate, methyl methacrylate, ethyl acrylate, ethyl methacrylate, propyl acrylate, propyl methacrylate, butyl acrylate, butyl methacrylate, amyl acrylate, amyl methacrylate, hexyl acrylate, hexyl methacrylate, octyl acrylate, octyl methacrylate, dodecyl acrylate, and doecyl methacrylate.

Specific examples of the copolymer ($a_4$) include terpolymers derived from ethylene/unsaturated carboxylic acid esters/hydroxyalkyl esters of unsaturated carboxylic acids, such as an ethylene/methyl acrylate/hydroxyethyl acrylate terpolymer, an ethylene/ethyl acrylate/hydroxyethyl acrylate terpolymer, an ethylene/butyl acrylate/hydroxyethyl acrylate terpolymer, an ethylene/methyl methacrylate/hydroxyethyl acrylate terpolymer, an ethylene/ethyl methacrylate/hydroxyethyl acrylate terpolymer and an ethylene/butyl methacrylate/hydroxyethyl methacrylate terpolymer; terpolymers derived from ethylene/vinyl esters/hydroxyalkyl esters of unsaturated carboxylic acids, such as an ethylene/vinyl acetate/hydroxyethyl acrylate terpolymer and an ethylene/vinyl acetate/hydroxyethyl methacrylate terpolymer; terpolymers derived from ethylene/unsaturated carboxylic acid esters/unsaturated carboxylic acids, such as an ethylene/methyl acrylate/acrylic acid terpolymer, an ethylene/glycol acrylate/acrylic acid terpolymer, an ethylene/butyl acrylate/acrylic acid terpolymers, an ethylene/methyl acrylate/methacrylic acid terpolymer, an ethylene/ethyl acrylate/methacrylic acid terpolymer, an ethylene/methyl methacrylate/acrylic acid terpolymer, an ethylene/ethyl methacrylate/acrylic acid terpolymer, an ethylene/methyl methacrylate/methacrylic acid terpolymer and an ethylene/butyl methacrylate/methacrylic acid terpolymer; terpolymers derived from ethylene/vinyl esters/unsaturated carboxylic acids, such as an ethylene/vinyl acetate/acrylic acid terpolymer, and an ethylene/vinyl acetate/methacrylic acid terpolymer; terpolymers derived from ethylene/unsaturated carboxylic acid esters/alkoxyvinyl silanes, such as an ethylene/methyl acrylate/trimethoxyvinylsilane terpolymer, an ethylene/ethyl acrylate/trimethoxyvinylsilane terpolymer, an ethylene/methyl methacrylate/trimethoxyvinylsilane terpolymer and an ethylene/butyl methacrylate/trimethoxyvinylsilane terpolymer; terpolymers derived from ethylene/vinyl esters/alkoxyvinylsilanes such as an ethylene/vinyl acetate/trimethoxyvinylsilane terpolymer; terpolymers derived from ethylene/unsaturated carboxylic acid esters/glycidyl esters of unsaturated carboxylic acids, such as an ethylene/methyl acrylate/glycidyl acrylate terpolymer, an ethylene/ethyl acrylate/glycidyl methacrylate terpolymer and an ethylene/butyl methacrylate/glycidyl methacrylate terpolymer; and terpolymers derived from ethylene/vinyl esters/glycidyl esters of unsaturated carboxylic acids, such as an ethylene/vinyl acetate/glycidyl acrylate terpolymer and an ethylene/vinyl acetate/glycidyl methacrylate terpolymer.

In the above embodiment of the present invention, the surface of the shaped article composed of EVA copolymer is coated with a solution of at least one resin selected from ($a_1$) to ($a_4$). A solvent capable of dissolving the polymer at a temperature of not more than 30° C. is preferably used to form the solution. Examples of such a solvent are benzene, toluene, xylene, ethylbenzene, isopropylbenzene, butylbenzene, diethylbenzene, amylbenzene, amyltoluene, cymene, cyclohexane, cycloheptane, cyclooctane, methylcyclohexane, ethylcyclohexane, hexane, heptane, octane, nonane, decane, dodecane, dichloroethane, trichloroethane, tetrachloroethane, dichloroethylene, trichloroethylene, tetrachloroethylene, dichloropropane, trichloropropane, chlorobutane, chloropentane, chloro-2-ethylhexane, chlorobenzene, dichlorobenzene, trichlorobenzene, chlorotoluene, dioxane, and tetrahydrofuran. Various known coating techniques can be used which include dip coating, spray coating, roll coating, brush coating or shower coating. The coating formed is then dried by desired means such as air drying at room temperature, air spraying at room temperature, drying in a hot air oven or drying in a hot air tunnel. Preferably, the drying is carried out at a temperature below the softening temperature or heat distortion temperature of the substrate shaped article. For example, drying temperatures of about 0° to about 80° C. can be used. The resin concentration of the coating solution is not critical, and may, for example, be within the range of about 1 to about 10%.

The above coating procedure can markedly improve the adhesion strength between the coated film and the surface of the shaped article composed of EVA copolymer.

According to another embodiment of this invention, a blend of the aforesaid EVA copolymer with at least one resin selected from ($b_1$) to ($b_4$) above is shaped to form a shaped article having markedly improved surface adhesion.

The saponified resin ($b_1$) is a saponification product of an EVA copolymer having a vinyl acetate content of 5 to 90% by weight. If its vinyl acetate content is outside this range, the resulting blend gives a shaped article having insufficient adhesion. The saponification product has a degree of saponification of preferably 1 to 100%.

The copolymer ($b_2$) is a copolymer of ethylene with a monomer having a radical selected from hydroxyl, carboxyl, alkoxy and glycidyl radicals. This copolymer has an ethylene content of about 70 to about 98% by weight. If the ethylene content is lower than about 70% by weight, the copolymer is difficult to synthesize, and its compatibility with the EVA copolymer is reduced. If the ethylene content is higher than about 98% by weight, a shaped article prepared from the resulting blend does not show sufficient adhesion to a paint. Hence, the ethylene content of the copolymer ($b_2$) should be within the above-specified range.

The copolymer ($b_3$) is a terpolymer of ethylene, an unsaturated ester and at least one monomer having a radical selected from the group consisting of hydroxyl, carboxyl, alkoxy and glycidyl radicals. This terpolymer has an ethylene content of about 55 to 98% by weight. The unsaturated ester may be those used in the resin ($a_4$) described hereinabove.

In the graft copolymer ($b_4$), the trunk polymer is a homopolymer of an $\alpha$-olefin or a copolymer of it with another copolymerizable monomer. The $\alpha$-olefin may have 2 to 5 carbon atoms. Examples of such polymer or copolymer are an ethylene/vinyl acetate copolymer, an ethylene/propylene copolymer, polyethylene, and polypropylene. The grafting monomer may be the same monomers as described hereinabove with regard to the graft copolymer ($a_3$).

According to still another embodiment of the invention, a graft copolymer obtained by grafting the same grafting monomer as used in resin ($a_3$) to the EVA copolymer is shaped to form a shaped article (B') having markedly improved surface adhesion. The grafting reaction can be performed in the solution or melt phase using a radical initiator. The preferred grafting ratio in this reaction is 0.02 to 5% by weight based on the graft copolymer.

According to a further embodiment of the invention, the surface of a shaped article of the above EVA copolymer is saponified to form a shaped article (B'') having improved surface adhesion. The saponification in this embodiment can be achieved, for example, by dipping the shaped article of EVA copolymer in an alkaline solution containing a lower alcohol as a main ingredient. Examples of the lower alcohol are methanol, ethanol and propanol.

In the present invention, the coating (C) having an elongation of at least 10% and composed of a synthetic resin paint containing an NCO-free radical is formed on the surface of the shaped article (A) of the EVA copolymer having the coating of a resin selected from ($a_1$) to ($a_4$), or on the surface of the shaped article (B), (B') or (B'') described hereinabove.

The coated surface of the shaped article (A) or the surface of the shaped article (B), (B') or (B'') contains an active hydrogen-containing functional group, or a group capable of forming an active hydrogen-containing functional group by hydrolysis, and exhibits markedly improved adhesion to the coating (C). The concentration of the functional group in the coated surface of the shaped article (A) is generally at least about $1 \times 10^{-8}$ mole, preferably at least about $1 \times 10^{-7}$ mole, per gram of the coating on the shaped article (A). For example, the concentration of the functional group is about $1 \times 10^{-8}$ mole to about $1 \times 10^{-3}$ mole per gram of the coating.

The hydroxyl group concentration on the surface of the shaped article (B'') is $5 \times 10^{-6}$ to $5 \times 10^{-3}$ mole per gram of the surface layer of the saponified EVA copolymer. This concentration range is estimated as follows:

The upper limit is obtained by calculating the hydroxyl group concentration of a 100% saponified product of the EVA copolymer since this saponified product permits sufficient adhesion of a polyurethane paint. The lower limit is an approximate value calculated on the basis of the fact that in a certain test, a 5% saponified product of an EVA copolymer having a vinyl acetate content of 14% showed fairly good adhesion to a polyurethane paint even when it was diluted to 10 times with the above EVA copolymer.

The synthetic resin paint containing an NCO-free radical used to form the coating (C) may be those which can form a dry coating having an elongation of at least 10% at a temperature below the softening or heat distortion temperature of the shaped article (A), (B), (B') or (B''). Preferably, the coating has an elongation of about 20% to about 500%.

The elongation of the coating is measured as follows: The paint is coated to a thickness of 70$\mu$ on a mold releasing paper, and the coated film is used as a test specimen. The elongation (%) of the test specimen is measured in accordance with ASTM D-412-51T.

Examples of such as synthetic resin paint are polyol-curable and catalyst-curable two-package polyurethane paints and moisture curable, heat-curable (blocked), and oxygen-curable (oil-modified) one-package polyurethane paints. Of these, the polyol-curable two-package polyurethane paints are preferred.

The isocyanate component as a main ingredient of such polyurethane paints include aromatic hydrocarbons having an isocyanate group, aliphatic hydrocarbons having an isocyanate group, hydrogenation products thereof, and adducts thereof with di- to pentahydric alcohols. Trimethylol propane is most frequently to it were melt-blended by an extruder. The blend was then press-molded to form a test specimen having a size of 150×80×2 mm.

The test specimen was coated to a thickness of 35μ with a two-package polyurethane paint (UREOL EVA, a trademark for a product of Kawakami Paint Co., Ltd., Japan) by a spray gun. The coating was tested for the items shown in Table 2.

Table 2

| Test item | Test method | Result |
| --- | --- | --- |
| Elongation | Tensile speed 200 mm/min. | 140% |
| Adhesion | Crosscut tape test | 100/100 |
| Impact strength | Du Pont method, 500 g-½"- 50 cm | Acceptable |
| Water resistance | Tap water, 40° C., 10 days | Acceptable |

The results show that a coating of polyurethane can be formed with satisfactory adhesion on the surface of a shaped article of EVA copolymer.

EXAMPLE 4

Ninety parts of an EVA copolymer having a vinyl acetate content of 10% by weight and a melt index of 20 (EVAFLEX V-561) and 10 parts of a graft copolymer of low-density polyethylene having a melt index of 23 and 3% by weight were melt-blended by an extruder, and the blend was press-molded to form a test specimen having a size of 150×80×2 mm. The test specimen was coated to a thickness of 35μ by a two-package polyurethane paint (UREOL EVA, trademark).

A crosscut tape test was peformed on the resulting coating, and it was found that the coating did not peel off at all. When this test was performed after dipping the test specimen in warm water at 40° C. for 10 days, the coating did not peel off at all.

EXAMPLE 5

Ninety-five parts of an EVA copolymer having a vinyl acetate content of 6% by weight and melt index of 25 (P-0607, a trademark for a product of Mitsui Polychemicals Co., Ltd.) and 5 parts of a graft copolymer of an EVA copolymer having a vinyl acetate content of 28% and a melt index of 150 and 2.5% by weight of maleic anhydride were melt-blended by an extruder, and the blend was injection-molded to form a test specimen having a size of 150×80×2 mm.

The test specimen was coated to a thickness of 35μ with a two-package polyurethane paint (UREOL EVA, trademark). In a crosscut tape test, the resulting coating showed no peeling at all. When the crosscut tape test was performed after dipping the test specimen in warm water at 40° C. for 10 days, no peeling of the coating occurred.

EXAMPLE 6

An EVA copolymer (V-561, trademark) having a vinyl acetate content of 10% by weight and a melt index of 20 was injection-molded to form a test specimen having a size of 150×150×2 mm.

A 3% tetrachloroethylene solution of a partially saponified EVA copolymer obtained by saponifying an EVA copolymer having a vinyl acetate content of 28% by weight and a melt index of 150 (EV-220, a trademark for a product of Mitsui Polychemicals Co., Ltd.) to a saponification degree of 10% was coated on the test specimen by a spray gun at 25° C., and dried for 15 minutes. The surface of the coating was further coated to a thickness of 50μ with a two-package polyurethane paint (UREOL EVA, trademark) by a spray gun.

The coating was tested for the items shown in Table 3 by the same methods as shown in Table 2. The results are shown in Table 3.

Table 3

| Test item | Results |
| --- | --- |
| Elongation | 140% |
| Adhesion | 100/100 |
| Impact strength | Acceptable |
| Water resistance | Acceptable |

The results show that the surface of the shaped article of the EVA copolymer has satisfactory coatability.

EXAMPLE 7

An EVA copolymer having a vinyl acetate content of 6% by weight and a melt index of 25 was injection-molded to form a test specimen having a size of 150×150×2 mm.

The test specimen was dipped at 40° C. for 2 minutes in a 3% toluene solution of a partially saponified EVA copolymer obtained by saponifying an EVA copolymer having a vinyl acetate content of 19% by weight and a melt index of 400 (EV-410, a trademark for a product of Mitsui Polychemicals Co., Ltd.) to a saponification degree of 10%, and then dried for 15 minutes in the air. Then, a two-package polyurethane paint (UREOL EVA, trademark) was coated to a thickness of 35μ by a spray gun on the resulting coating.

The coating did not show peeling in the crosscut tape test.

EXAMPLE 8

Ninety parts of an EVA copolymer having a vinyl acetate content of 14% by weight and a melt index of 15 and 10 parts of saponified EVA copolymer obtained by saponifying an EVA copolymer having a vinyl acetate content of 33% and a melt index of 31 (EV-150, a trademark for a product of Mitsui Polychemicals Co., Ltd.) to a saponification degree of 90% were melt-blended by an extruder, and the blend was press-molded to form a test specimen having a size of 150×80×2 mm.

The test specimen was coated to a thickness of 35μ with a two-package polyurethane paint to form a coating having an elongation of 100 to 110%.

The coating did not show peeling in the crosscut tape test.

EXAMPLE 9

An EVA copolymer having a vinyl acetate content of 12% by weight and a melt index of 12 (P-1207, a trademark for a product of Mitsui Polychemicals Co., Ltd.) was injection-molded to form a test specimen having a size of 150×150×2 mm.

The test specimen was coated at 25° C. by a spray gun a 2% toluene solution of a polymer obtained by saponifying an EVA copolymer having a vinyl acetate content of 28% by weight and a melt index of 150 (EV-220, a trademark for a product of Mitsui Polychemicals Co., Ltd.) to a saponification degree of 10%, and grafting 0.3% by weight of acrylic acid to the copolymer. The coating was dried for 15 minutes in the air, and then further coated by a spray gun with a two-package polyurethane paint (UREOL EVA, trademark).

The final coating obtained did not show peeling in the crosscut tape test.

used as the polyol for forming such adducts. Examples of the polyol component, another main ingredient of the polyurethane paints, are polyester polyols, polyether polyols, acrylic polyols, and vinyl polyols. Usually, such polyurethane-type paints contain a pigment, a solvent and optional coating aids such as a plasticizer, drying agent, curing agent, antiskinning agent, thickener, gloss-imparting agent, smoothing agent, sag inhibitor, antiseptic, anticorrosive agent, mold proofing agent or ultraviolet absorber.

Any known techniques can be used to form the coating (C) in this invention. Examples are spray coating by a spray gun, electrostatic coating, dip coating, brush coating or roll coating.

The present invention thus provides shaped articles of EVA copolymer having a specific coating firmly adhering to it, which are free from the conventional defects such as poor scratch resistance or poor decorative quality. By using a polyurethane-type paint having flexibility to form the specific coating on the shaped article from the resins ($a_1$) to ($a_4$), the appearance of the shaped article is satisfactory for practical purposes. The shaped articles of the present invention are useful in various applications, but an especially preferred application is in interior and exterior finishing or trimming parts of automobiles. Specifically, the interior finishing or trimming parts include dashboards, arm chairs and door handles. The exterior finishing or trimming parts include molded articles for bumpers, and mudguards. The molded articles for bumpers mean molded articles including a reinforcing metal inside which are used as bumpers themselves, and those molded articles which supplement the function of bumpers and also have a decorating function. These molded articles are used to cover a part or the whole of a bumper, and have the function of alleviating the external force which the bumper undergoes and thus alleviating the force which the automobile body receives from the bumper.

The following Examples and Comparative Examples illustrate the present invention in greater detail. The invention should be construed not to be limited by these specific examples. All parts in these examples are by weight unless otherwise specified.

EXAMPLE 1 and COMPARATIVE EXAMPLES 1 and 2

Eighty parts of an EVA copolymer having a vinyl acetate content of 14% by weight and a melt index of 15 (EVAFLEX P-1407, a tradename for a product of Mitsui Polychemical Co., Ltd., Japan), 10 parts of a master batch of EVAFLEX P-1407 containing 10% by weight of carbon black, and 10 parts of a graft copolymer of styrene and 2% by weight of maleic anhydride were melt-blended. The blend was press-molded to form a test specimen having a size of 150×150×2 mm.

The test specimen was coated to a thickness of 100μ [specimen (A)] with a two-package black polyurethane paint (the coating had an elongation of 110 to 110%).

A crosscut tape test was performed on the resulting coating, and it was found that the coating did not peel off at all from the surface of the specimen.

Separately, 90 parts of EVAFLEX P-1407 and 10 parts of the master batch containing carbon black were melt-blended, and the blend was press-molded to form a specimen having a size of 150×150×2 mm [specimen (B)].

A test specimen (C) was prepared by coating the specimen (B) in the same way as in the preparation of the sample (A). The specimen (C) was subjected to the same crosscut tape test as above.

The specimens (A) and (B) were tested for appearances and abrasion indices by a TABER abrasion tester. The results are shown in Table 1. As is clearly seen from Table 1, the specimen (A) having the urethane coating showed far better results.

Table 1

|  | Example 1 (specimen A) | Comparative Example 1 (specimen B) | Comparative Example 2 (specimen C) |
| --- | --- | --- | --- |
| Appearance | Good | Poor (insufficient gloss) | — |
| Abrasion index (mg/1000 cycles) (*) | 6.6 | 14 | — |
| Crosscut tape test (adhesion) | 100/100 | — | 0/100 |

(*) Abrasion loss in accordance with ASTM D-1242-56.

EXAMPLE 2 and COMPARATIVE EXAMPLE 3

Eighty parts of an EVA copolymer having a vinyl acetate content of 14% by weight and a melt index of 15 (EVAFLEX P-1407, trademark), 10 parts of a master batch of EVAFLEX P-1407 containing 10% by weight of carbon black, and 10 parts of a graft copolymer consisting of EVA copolymer having a vinyl acetate content of 19% by weight and a melt index of 10 and 2% by weight of maleic anhydride grafted to it were melt-blended, and the blend was injection-molded under the following conditions to form a cover for the side ends of an automobile bumper.

Cylinder temperature: 180° C.
Mold temperature: 25° C.
Injection pressure: 1050 kg/cm$^2$
Weight of the molded article: 400 g A two-package polyurethane paint was sprayed onto the resulting molded article to form a coating having an elongation of 118%. The coated bumper cover had better gloss and appearance than the uncoated bumper cover (Comparative Example 3).

The coated and uncoated bumper covers were each rubbed strongly 20 times with a brush in water containing a detergent to examine the state of scratch on their surfaces. The trace of brushing was clearly seen in the uncoated bumper cover (Comparative Example 3), but was scarcely observed in the coated one.

COMPARATIVE EXAMPLE 4

Eighty parts of the same EVAFLEX P-1407 as used in Example 2 and 10 parts of the same master batch as used in Example 2 were melt-blended, and the blend was injection-molded under the same conditions as in Example 2 to form an automobile bumper cover. The molded article was coated with the same two-package polyurethane paint as used in Example 2. When the coated bumper cover was subjected to a crosscut tape test, the result was 0/100.

EXAMPLE 3

Ninety-eight parts of an EVA copolymer having a vinyl acetate content of 10% by weight and a melt index of 20 (EVAFLEX V-561, a trademark for a product of Mitsui Polychemicals Co., Ltd.) and 2 parts of a graft copolymer consisting of EVA copolymer having a vinyl acetate content of 14% by weight and a melt index of 15 and 1.5% by weight of maleic anhydride grafted

EXAMPLE 10

An EVA copolymer having a vinyl acetate content of 10% by weight and a melt index of 20 was injection-molded to form a test specimen having a size of 150×80×2 mm. The test specimen was dipped for 30 seconds at 40° C. in a 2% toluene solution of a polymer obtained by grafting 0.5% by weight of maleic anhydride to an EVA copolymer having a vinyl acetate content of 19% by weight and a melt index of 400 (EV-410, a trademark for a product of Mitsui Polychemicals Co., Ltd.), and then dried in the air for 15 minutes. A two-package polyurethane paint (UREOL EVA, trademark) was brush-coated on the resulting coating.

The final coating obtained did not show peeling in the crosscut tape test.

EXAMPLE 11

An EVA copolymer having a vinyl acetate content of 14% by weight and a melt index of 15 (P-1407, trademark) was injection-molded to form a test specimen having a size of 150×80×2 mm. The test specimen was dipped for 30 seconds at 30° C. in a 2% xylene solution of a terpolymer of ethylene/vinyl acetate/methacrylic acid having a vinyl acetate content of 25% by weight and an acid value of 6, and then dried in the air for 30 minutes. A two-package polyurethane resin paint (UREOL EVA) was brush-coated on the resulting coating.

The final coating obtained did not show peeling in the crosscut tape test.

EXAMPLE 12

Seventy parts of an EVA copolymer having a vinyl acetate content of 19% by weight and a melt index of 15 (P-1907, a trademark for a product of Mitsui Polychemicals Co., Ltd.) and 30 parts of an ethylene/vinyl acetate/glycidyl methacrylate terpolymer (BOND FAST 2B, a trademark for a product of Sumitomo Chemicals Co., Ltd.) were melt-blended, and the blend was injection-molded to form a test specimen having a size of 150×80×2 mm.

A two-package polyurethane paint (UREOL EVA, trademark) was coated on the test specimen by a spray gun. The final coating obtained did not show peeling in the crosscut tape test.

EXAMPLE 13

Seventy five parts of an EVA copolymer having a vinyl acetate content of 14% by weight and a melt index of 15 (P-1407, trademark) and 25 parts of an ethylene/vinyl acetate/methacrylic acid terpolymer were melt-blended, and the blend was press-molded to form a test specimen having a size of 150×80×20 mm. The test specimen was coated by a spray gun with a two-package polyurethane paint (UREOL EVA, trademark). The coating did not show peeling in the crosscut tape test.

COMPARATIVE EXAMPLE 5

A test specimen having a size of 150×80×2 mm was prepared by injection molding using an EVA copolymer having a vinyl acetate content of 10% by weight and a melt index of 20 (V-561, trademark) and an EVA copolymer having a vinyl acetate content of 19% by weight and a melt index (P-1907, a trademark for a product of Mitsui Polychemical Co., Ltd.). The test specimen was coated to a thickness of 35μ by a spray gun with a two-package polyurethane paint (UREOL EVA, trademark). The coating obtained peeled off in the crosscut tape test.

EXAMPLE 14

A test specimen having a size of 150×80×2 mm was injection-molded using an EVA copolymer having a vinyl acetate content of 14% and a melt index of 15 (P-1407, trademark).

The test specimen was dipped at 40° C. for 10 minutes in a solution consisting of 85.7% by weight of isopropanol, 12.0% by weight of methanol and 2.3% by weight of sodium methylate, washed with water, and then dried. A two-package polyurethane paint (UREOL EVA, trademark) was brush-coated on the resulting coating, and dried at 40° C. for 3 days. The final coating obtained did not show peeling in the crosscut tape test.

What we claim is:

1. A shape article comprising a substrate substantially of an ethylene-vinyl acetate copolymer and formed on its surface, (C) a coating having an elongation of at least 10% formed from a synthetic resin paint containing an NCO-free radical; said substrate being either
    (A) a shaped article of an ethylene-vinyl acetate copolymer having a vinyl acetate content of about 3 to about 35% by weight, said shaped article having a coating on its surface formed from a solution of a resin selected from the group consisting of
    ($a_1$) a partially saponified product having a degree of saponification of up to about 50% of an ethylene-vinyl acetate copolymer having a vinyl acetate content of about 12 to about 45% by weight,
    ($a_2$) a graft copolymer of said partially saponified ethylene-vinyl acetate copolymer ($a_1$) and a carboxyl-containing monomer grafted thereto,
    ($a_3$) a graft copolymer of an ethylene-vinyl acetate copolymer having a vinyl acetate content of about 12 to about 45% by weight and grafted thereto, at least one monomer having a radical selected from the group consisting hydroxyl, carboxyl, acid anhydride, alkoxy and glycidyl radicals, and
    ($a_4$) a copolymer of ethylene, an unsaturated ester and at least one monomer having a radical selected from the group consisting of hydroxyl, carboxyl, alkoxy and glycidyl radicals, said copolymer having an ethylene content of about 55 to about 88% by weight,
    (B) a shaped article of a blend of an ethylene-vinyl acetate copolymer having a vinyl acetate content of about 3 to about 35% by weight with a resin selected from the group consisting of
    ($b_1$) about 5 to about 30 parts by weight, based on the blend, of a saponification product of an ethylene-vinyl acetate copolymer having a vinyl acetate content of about 5 to about 90% by weight,
    ($b_2$) about 5 to about 30% by weight, based on the weight of the blend, of a copolymer of ethylene and at least one monomer having a radical selected from the group consisting of hydroxyl, carboxyl, alkoxy and glycidyl radicals, said copolymer having an ethylene content of about 70 to about 98%,
    ($b_3$) about 2 to about 30% by weight, based on the blend, of a copolymer of ethylene, an unsaturated ester and at least one monomer having a radical selected from the group consisting of hydroxyl, carboxyl, alkoxy and glycidyl radicals, said copolymer having an ethylene content of about 55 to about 98% by weight, and (b₄) about 0.5 to about 30% by weight, based on the blend, of a graft copolymer of a polymer of an α-olefin or a copolymer of an α-olefin with up to 45% by weight of another copolymerizable monomer, and grafted thereto, at least one monomer having a radical selected from the group consisting of hydroxyl, carboxyl, acid anhydride, alkoxy and glycidyl radicals, (B') a shaped article of graft copolymer of an ethylene-vinyl acetate copolymer having a vinyl acetate content of about 3 to about 35% by weight, and grafted thereto, at least one monomer having a radical selected from the group consisting of hydroxyl, carboxyl, acid anhydride, alkoxy and glycidyl radicals, or (B") a shaped article resulting from the saponification of the surface of a shaped article of an ethylene-vinyl acetate copolymer having a vinyl acetate content of 3 to 35% by weight.

2. The shaped article of claim 1 which is a component part for the interior or exterior finishing or trimming of automobiles.

3. The shaped article of claim 1 wherein the grafting monomer in resins (a₃) and (b₄) is a monomer selected from the group consisting of hydroxyalkyl esters of unsaturated carboxylic acids, chlorohydroxyalkyl esters of unsaturated carboxylic acids, unsaturated carboxylic acids, unsaturated carboxylic acid anhydrides, alkoxyvinylsilanes, alkylalkoxyvinylsilanes and glycidyl esters of unsaturated carboxylic acids.

4. The shaped article of claim 1 wherein the comonomer having the specified radical in (a₄), (b₂) and (b₃) is a monomer selected from the group consisting of hydroxyalkyl esters of unsaturated carboxylic acids, chlorohydroxyalkyl esters of unsaturated carboxylic acids, unsaturated carboxylic acids, alkoxyvinylsilanes, alkylalkoxyvinylsilanes and glycidyl esters of unsaturated carboxylic acids.

5. The shaped article of claim 1 wherein the unsaturated ester in (b₃) is an unsaturated carboxylic acid ester or a vinyl ester.